United States Patent
Mori

(10) Patent No.: US 8,145,924 B2
(45) Date of Patent: Mar. 27, 2012

(54) STORAGE APPARATUS AND START-UP CONTROL METHOD FOR THE SAME

(75) Inventor: Hajime Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 869 days.

(21) Appl. No.: 12/184,758

(22) Filed: Aug. 1, 2008

(65) Prior Publication Data
US 2009/0300374 A1     Dec. 3, 2009

(30) Foreign Application Priority Data
Jun. 3, 2008   (JP) .................................. 2008-146290

(51) Int. Cl.
*G06F 1/32*   (2006.01)
*G06F 9/24*   (2006.01)

(52) U.S. Cl. ............ 713/320; 713/1; 713/300; 713/323; 713/324; 713/340

(58) Field of Classification Search .................. 713/300, 713/320, 323, 324, 340, 1
See application file for complete search history.

(56) References Cited

U.S. PATENT DOCUMENTS
7,752,468 B2 *   7/2010   Dodeja et al. ................. 713/300
2005/0210304 A1   9/2005   Hartung et al.

FOREIGN PATENT DOCUMENTS
JP     2007-025733 A     2/2007
* cited by examiner

*Primary Examiner* — Kim Huynh
*Assistant Examiner* — Michael J Brown
(74) *Attorney, Agent, or Firm* — Sughrue Mion, PLLC

(57) ABSTRACT

At the time of initial start-up, two or more storage units are started as a start-up control unit so that the total power consumption will not exceed specified electric power.
Upon initial start-up of additional chassis, a CPU 214 for a basic chassis 400 selects, based on predicted power consumption for additional chassis 410, 412, etc., N additional chassis as a start-up control unit so that total power consumption for the basic chassis 400 and the respective additional chassis 410, 412 as recognized by an external power source 600 will not exceed the specified electric power; and the CPU 214 then turns on auxiliary power switches 510, 512 for the additional chassis 410, 412 belonging to the selected start-up control unit.

8 Claims, 11 Drawing Sheets

FIG.3

| SPECIFIED ELECTRIC POWER | CURRENT POWER CONSUMPTION |
|---|---|
| 2000W | 1200W |

FIG.4

| CHASSIS TYPE | NORMAL-OPERATION/ START-UP POWER CONSUMPTION | REMARKS |
|---|---|---|
| CONTROLLER CHASSIS | 500W/550W | TWO DISK CONTROLLERS ARE MOUNTED |
| FC ADDITIONAL CHASSIS | 500W/600W | 15 FC DISKS ARE MOUNTED |
| SATA ADDITIONAL CHASSIS | 300W/350W | 15 SATA DISKS ARE MOUNTED |

FIG.5

| START-UP CONTROL UNIT 225A | CHASSIS TYPE 225B | NORMAL-OPERATION/ START-UP POWER CONSUMPTION 225C | PREDICTED POWER CONSUMPTION 225D | START-UP TYPE 225E | START-UP PRIORITY 225F | OPERATION STATUS 225G |
|---|---|---|---|---|---|---|
| BASIC CHASSIS 001 | CONTROLLER CHASSIS | 500/550 | --- | NORMAL START-UP | 5 | IN OPERATION |
| ADDITIONAL CHASSIS 001 | FC ADDITIONAL CHASSIS | 500/600 | 600W | --- | --- | STOPPED |
| ADDITIONAL CHASSIS 002 | SATA ADDITIONAL CHASSIS | 300/350 | 600W | INITIAL START-UP | --- | IN OPERATION |
| ADDITIONAL CHASSIS 003 | UNKNOWN | UNKNOWN/UNKNOWN | 600W | INITIAL START-UP | 1 | --- |
| ADDITIONAL CHASSIS 004 | UNKNOWN | UNKNOWN/UNKNOWN | 600W | INITIAL START-UP | 1 | --- |

225

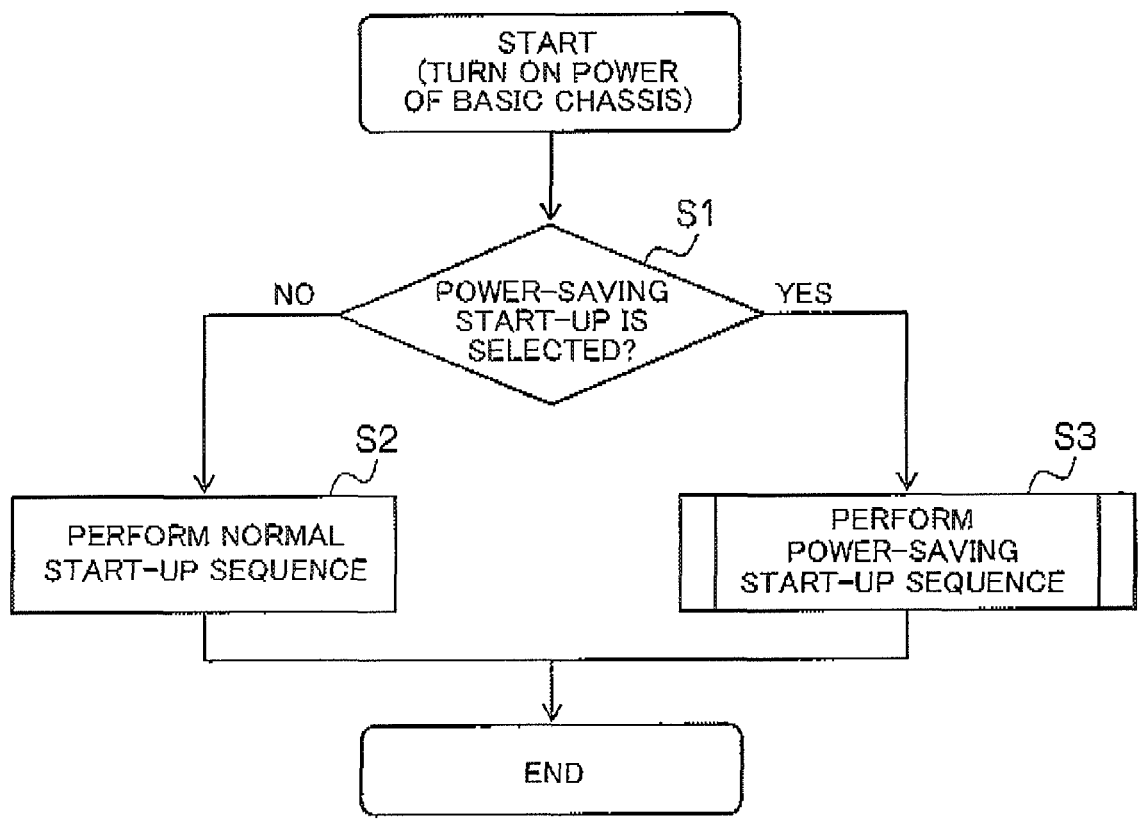

FIG.9

| START-UP PRIORITY VALUE | EXAMPLES OF SETTING STANDARDS |
|---|---|
| 1 | • INITIAL START-UP<br>• TARGET OF DESTAGE PROCESSING AFTER RESTART |
| 2 | • WHEN ANY CHANGED PORTION IS INCLUDED (FOR EXAMPLE, INCREASE OR DECREASE OF HDD) |
| 3 | • WHEN THERE IS ANY START-UP REASON OTHER THAN ACCESS BY HOST(S) (FOR EXAMPLE, PERIODICAL DISK DIAGNOSIS) |
| 4 | WHEN THE RELEVANT DEVICE WAS IN OPERATION (NOT ALWAYS-ON OPERATION) WHEN IT WAS STOPPED LAST TIME |
| 5 | WHEN ALWAYS-ON OPERATION SETTING IS MADE |
| --- (NO VALUE) | WHEN START-UP IS UNNECESSARY |

STORAGE APPARATUS AND START-UP CONTROL METHOD FOR THE SAME

CROSS-REFERENCE TO RELATED APPLICATIONS

This application relates to and claims priority from Japanese Patent Application No. 2008-146290, filed on Jun. 3, 2008, the entire disclosure of which is incorporated herein by reference.

BACKGROUND

1. Field of the Invention

The present invention relates generally to a storage apparatus and a start-up control method for the storage apparatus. Particularly, the invention relates to a technique of controlling electric power consumed by the storage apparatus.

2. Description of Related Art

A storage apparatus has: a plurality of disk devices that are managed by a RAID (Redundant Array of Inexpensive Disks) system and arranged in an array; and a controller for controlling the plurality of disk devices. The storage apparatus is connected to a host computer such as a server (hereinafter referred to as a "host") and provides redundant logical storage areas (hereinafter also referred to as "logical volumes") according to the RAID configuration.

Recently, the amount of data to be managed by, for example, business enterprises has been increasing day by day. Accordingly, the size of storage apparatuses is increasing and power consumption is also increasing. Also, the quantity of electronic devices including storage apparatuses installed at a data center or similar tends to increase, resulting in an increase in power consumption over the entire data center. The term "electronic devices" herein means equipment operated by power feeding.

Among various electronic devices installed at a data center or similar, there are electronic devices that can be switched from a normal operation mode to a power-saving mode, and electronic devices that perform operation control of their power-distributed portions so that power consumption can be reduced compared to the normal operation state by, for example, stopping power feeding.

U.S. Patent Application Publication No. 2005-0210304 discloses an example of a technique for limiting the power consumption of a storage apparatus contained in an electronic device. U.S. Patent Application Publication No. 2005-0210304 discloses a technique whereby when starting disk devices, a storage apparatus predicts power consumption after starting the disk devices, judges whether the predicted power consumption will exceed a predetermined threshold value, and controls starting or stopping of the disk devices based on the above judgment. According to U.S. Patent Application Publication No. 2005-0210304, power consumption of a storage apparatus can be reduced by limiting the power consumption of the storage apparatus to a predetermined threshold value or less by controlling starting or stopping of disk devices.

Japanese Patent Application Laid-Open (Kokai) Publication No. 2007-25733 discloses a technique whereby when an electronic device starts a power-saving mode, even if a control means for the electronic device is reset due to a power supply voltage drop, the power mode can be normally shifted to the power-saving mode by setting a power-saving flag to hold memory and starting the activation of the power-saving mode if the power saving flag in the hold memory is set after the electronic device is reset and then reactivated.

However, the conventional art does not give consideration to starting or restarting a storage apparatus when it is initially installed or added.

Specifically speaking, when the storage apparatus is divided into disk device or chassis units as power-saving control portions by using, for example, a MAID (Massive Arrays of Inactive Disks) technique and each power-saving control portion is to be started, it is necessary to be aware of the power consumption of the power-saving control portions to be started in order to keep the required power for each power-saving control portion at a predetermined power threshold value or less.

However, when initially installing or adding a storage apparatus, information about a new chassis, particularly its power consumption, is unknown. Therefore, if the power-saving control portion is started while the power consumption of the new chassis is unknown, it is difficult to keep the power consumption of the power-saving control portion at the threshold value or less.

Also, when restarting the storage apparatus, which power-saving control portion should be started cannot be ascertained without knowing the power consumption of each power-saving control portion. Therefore, if the power-saving control portion(s) are restarted while the power consumption of each power-saving controller portion is unknown, it is difficult to keep the power consumption of the power-saving control portion(s) at or under the threshold value.

SUMMARY

It is an object of the present invention to provide a storage apparatus and a storage apparatus start-up control method, whereby upon initial start or restart of start-up control units, two or more start-up control units can be started or restarted so that total power consumption for the entire load as recognized by a power source will not exceed specified electric power smaller than the maximum possible electric power supplied by the power source.

In order to achieve the above object, the present invention has a feature whereby, a storage apparatus includes a controller for controlling a memory unit having a storage device group by diving the memory unit into a plurality of start-up control units that can be started, wherein upon initial start of start-up control units, the controller selects and starts, from among the plurality of start-up control units and based on predicted power consumption for the memory unit, two or more start-up control units so that total power consumption for all the loads, that is, the memory unit and the controller as recognized by the power source will not exceed the specified electric power smaller than the maximum possible electric power supplied by the power source.

The invention also has a feature whereby, a storage apparatus includes a controller for controlling a memory unit having a storage device group by dividing the memory unit into a plurality of start-up control units, wherein upon restart of start-up control units, the controller selects and restarts, from among the plurality of start-up control units and based on the actual power consumption for the memory unit (which is power consumption when the memory unit is in operation), two or more start-up control units so that total power consumption for all the loads, that is, the memory unit and the controller as recognized by the power source will not exceed the specified electric power smaller than the maximum possible electric power supplied by the power source.

When initially starting or restarting the storage apparatus according to this invention, two or more start-up control units can be started or restarted so that total power consumption for all the loads, that is, the memory unit and the controller as recognized by the power source will not exceed the specified electric power.

Other aspects and advantages of the invention will be apparent from the following description and the appended claims.

BRIEF DESCRIPTION OF THE DRAWINGS

FIG. 3 is a configuration diagram of a power management table.

FIG. 4 is a configuration diagram of a catalogue specification table.

FIG. 5 is a configuration diagram of a start-up order table.

FIG. 6 is a flowchart explaining judgment processing when turning power on.

FIG. 9 is a configuration diagram explaining startup priority values and examples of setting standards.

DETAILED DESCRIPTION OF PREFERRED EMBODIMENTS

Figure 1:
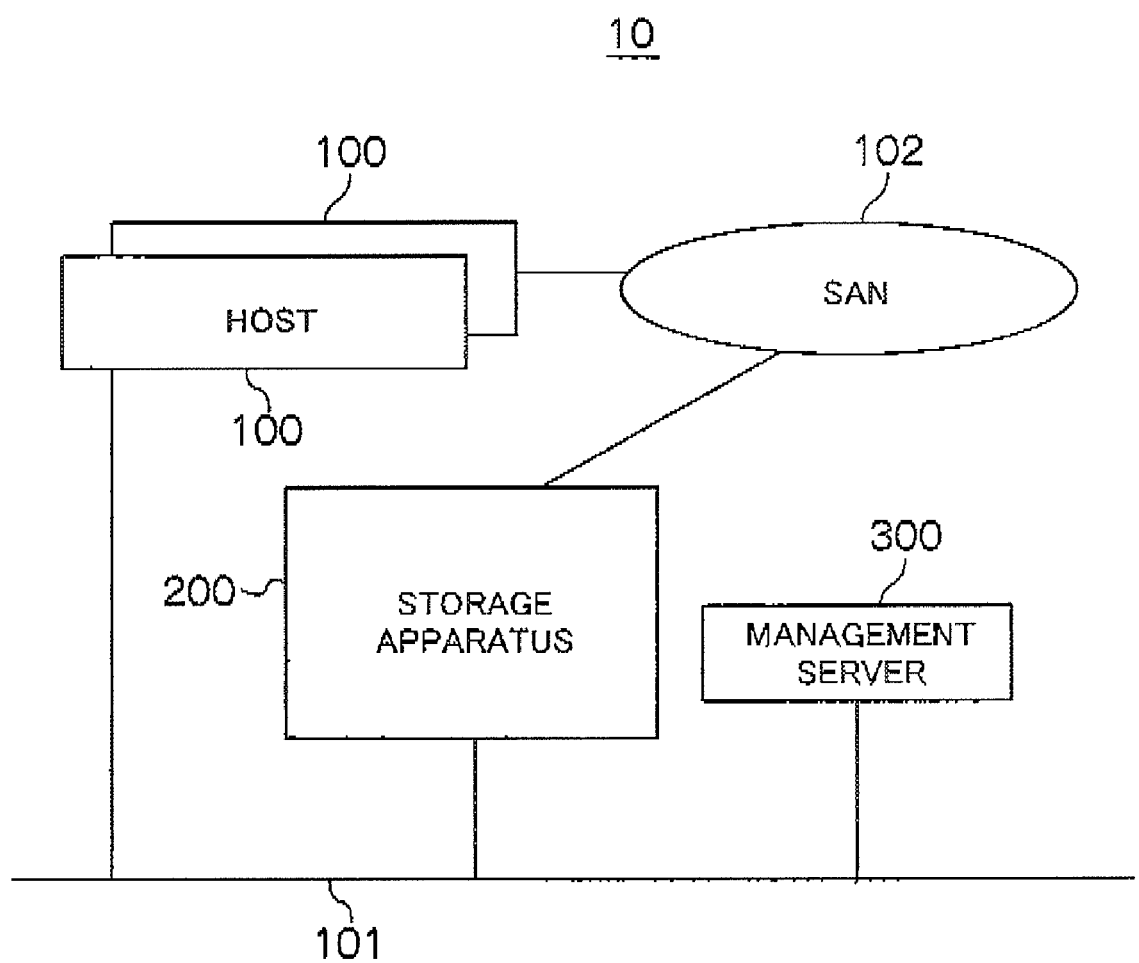
FIG. 1 is a configuration diagram of a storage system in which the present invention is employed.

Embodiments of the present invention will be described below with reference to the attached drawings. FIG. 1 is a block configuration diagram of a storage system in which a storage apparatus according to this invention is utilized.

A storage system 10 according to an embodiment of the invention has hosts 100, a storage apparatus 200, and a management server 300. The storage system 10 according to this embodiment has two hosts 100, one storage apparatus 200, and one management server 300, but may include one or more hosts 100, storage apparatuses 200, and management servers 300 respectively.

The hosts 100, the storage apparatus 200, and the management server 300 are connected to a management network 101 such as a LAN (Local Area Network). The hosts 100 are connected via a data network 102, such as a SAN (Storage Area Network), to the storage apparatus 200. The SAN uses a communication protocol such as Fibre Channel protocol or ISCSI (Internet Small Computer System Interface) protocol.

The storage apparatus 200 is connected via the data network 102 to the hosts 100 and provides storage areas to the hosts 100. The storage apparatus 200 is also connected via the management network 101 to the management server 300. Further details of the configuration of the storage apparatus 200 will be explained later.

The host 100 is a commonly-used computer and includes a CPU, memory, a SAN interface for connection with the data network 102, and so on (all of these components are omitted in FIG. 1). The host 100 executes business programs or similar applications, and writes the processing results to the storage apparatus 200 via the data network 102, or utilizes information resources stored in the storage apparatus 200.

The management server 300 is a commonly-used computer and includes a CPU, memory, input units such as a keyboard and a mouse, a display unit such as a monitor, and a management interface (all of these components are omitted in FIG. 1). The memory stores, for example, system power management programs and system power management tables.

The storage apparatus 200 is an apparatus composed of a plurality of chassis. One of the plurality of chassis is a basic chassis (first chassis) enabling communication with a host system (e.g., the host(s) 100) via the data network 102, communication with the management server 300 via the management network 101, and communication to control the entire storage apparatus 200 that controls the operation of other chassis. Each chassis other then the basic chassis is an additional chassis (second chassis) that is equipped with a plurality of storage devices (e.g., disk devices) and connected with the basic chassis, and transfers signals and data to the basic chassis.

The basic chassis accesses disk devices in the additional chassis and reads/writes data from/to the disk devices according to commands issued from the host(s) 100. Incidentally, the basic chassis may have a plurality of storage devices.

Figure 2:
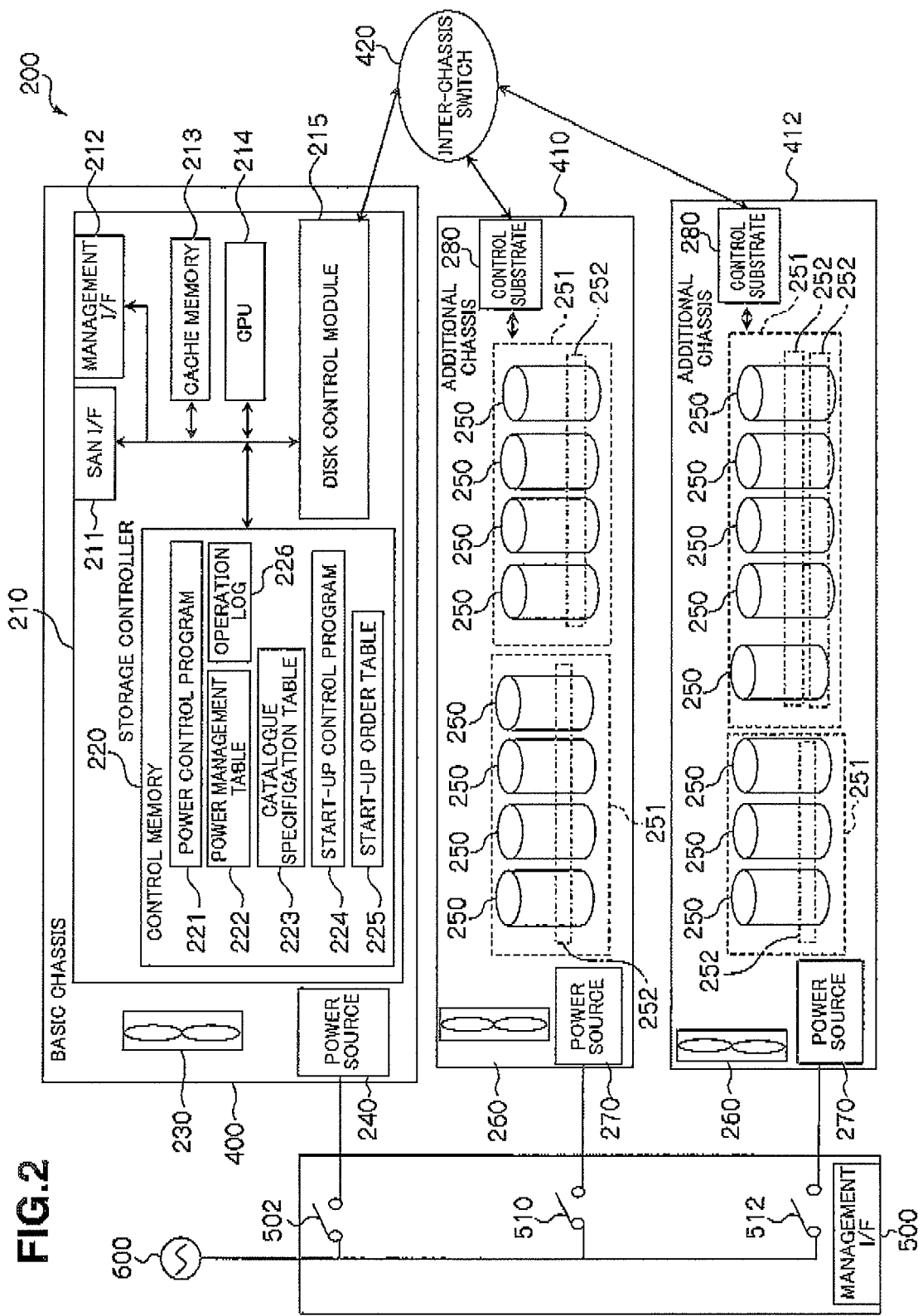
FIG. 2 is a block diagram of the storage apparatus.

FIG. 2 is a schematic diagram showing an example of the configuration of the storage apparatus 200. The storage apparatus 200 has one basic chassis 400 and two additional chassis 410, 412 and is connected via a power switch 500 to an external power source 600. In this configuration, the storage apparatus 200 can collect, via a management I/F for the power switch 500, status information about open/close status of a main power switch 502 and auxiliary power switches 510, 512 and control opening or closing of the main power switch 502 and the auxiliary power switches 510, 512 individually. Incidentally, FIG. 2 shows a configuration example of the storage apparatus having one basic chassis 400 and two additional chassis 410, 412, but the storage apparatus may have one basic chassis 400 and a plurality of (three or more) additional chassis. Also, a plurality of basic chassis 400 amongst which the functions of the first chassis are divided and assigned may be provided.

The basic chassis 400 is configured so that its main components are a storage controller 210, a power source 240, and fans 230. As mentioned earlier, the basic chassis may include one or more disk devices.

The storage controller 210 is a control module that executes various control processing of the storage apparatus 200. The storage controller 210 is configured so that its main components are a SAN interface (referred to as "SAN I/F" in the drawing) 211, a disk control module 215, cache memory 213, a CPU 214, control information memory 220, and a management interface (referred to as "management I/F" in the drawing) 212 that is an interface with the management network 101. The CPU 214 serves as a controller for controlling a target at the time of start-up or restart by dividing the control target into a plurality of start-up control units that can be started. In this embodiment, one additional chassis is defined as one start-up control unit.

The SAN interface 211 is an interface that is connected as a data interface via the data network 101 to the host(s) 100 and inputs/outputs data to/from the hosts 100. The disk control module 215 is a control module for controlling disk devices 250 in the additional chassis 410, 412 to which the basic chassis 400 is connected.

The cache memory 213 temporarily stores data to be written to the disk devices 250 in each additional chassis 410, 412 and data read from the disk devices 250.

The control memory 220 stores a power control program 221 as an example of programs for controlling the disk devices 250, a power management table 222, a catalogue specification table 223, a start-up control program 224, a start-up order table 225, and an operation log 226. The power control program 221 is a program executed by the CPU 214 for controlling each chassis by having it use maximum power or saved power. The start-up control program 224 is a program executed by the CPU 214 for initially starting or restarting each chassis. The operation log 226 serves as a memory unit for recording histories or similar when the CPU 214 monitors whether each chassis is in operation or not. Incidentally, details of the power management table 221, the catalogue specification table 223, and the start-up order table 225 will be explained later.

The cache memory 213 and the control memory 220 may be either volatile memory or nonvolatile memory (e.g., flash memory). Furthermore, the storage controller 210 may have a plurality of cache memories 213 and control memories 220, which may be arranged in redundant configurations.

Each additional chassis 410, 412 serving as a storage unit constituting one element of the memory unit includes one or more disk devices 250, fans 260, a power source 270, and a control substrate 280. In this configuration, each additional chassis 410, 412 serves as a storage unit as well as a start-up control unit that is a control target of the CPU 214. The control substrates 280 for the additional chassis 410, 412 are connected to each other via an inter-chassis switch 420 and also connected to the disk control module 215 for the basic chassis 400 to transfer signals and data between the disk control module 215 and the disk devices 250 in the additional chassis 410, 412. For example, the control substrates 280 for the additional chassis 410, 412 communicate various information about the additional chassis 410, 412 (such as the operation status and failure information about each disk device 250) with the storage controller 210 for the basic chassis 400. When performing such communication, a different connection line from that used for transferring signals and data of the disk devices 250 may be used.

The power source 240 for the basic chassis 400 and the power sources 270 for the additional chassis 410, 412 convert alternating-current (AC) power or direct-current (DC) power, which is input from the external power source 600 via the power switch 500, into DC power with a specified voltage and supply the obtained DC power to the components in the relevant chassis (such as the storage controller 210, the disk devices 250, and the fans 230) respectively. The power sources 240, 270 can output various voltages.

The power switch 500 includes a main power switch 502 and auxiliary power switches 510, 512, and so on, that are connected in parallel with the main power switch 502. The main power switch 502 is inserted into a power feeding circuit connecting the external power source 600 with the power source 240 for the basic chassis 400 and is opened or closed manually or in accordance with instructions from the storage controller 210. The auxiliary power switch 510 is inserted into a power feeding circuit connecting the external power source 600 and the power source 270 for the additional chassis 410 and is opened or closed in accordance with instructions from the storage controller 210. The auxiliary power switch 512 is inserted into a power feeding circuit connecting the external power source 600 and the power source 270 for the additional chassis 412 and is opened or closed in accordance with instructions from the storage controller 210. Although not shown in the drawing, each of other auxiliary power switches connected to other additional chassis is also inserted into a power feeding circuit connecting the external power source 600 and the relevant additional chassis and is opened or closed in accordance with instructions from the storage controller 210.

The external power source 600 is not limited to an AC power source, and may be a DC power source. The power sources 240, 270 may be configured to be capable of stopping power feeding to each component in the relevant chassis in accordance with instructions from the storage controller 210 for the basic chassis 400. Furthermore, the management server 300 or the control substrates 280 or other components for the additional chassis 410, 412 may command such stoppage of power feeding.

The fans 230 for the basic chassis 400 and the fans 260 for the additional chassis 410, 412 are intended to introduce cooling air into the relevant chassis and thereby cool the inside of the chassis. Incidentally, the additional chassis 410, 412 can start or stop the operation of the fans 230, 260 and control the number of revolutions of the fans 230, 260 in accordance with instructions from the storage controller 210 for the basic chassis 400.

In this embodiment, the additional chassis 410, 412 is defined as a storage unit having a configuration including one or more disk devices 250, the fans 260, the power source 270, and the control substrate 280. Therefore, each storage unit can be started or stopped individually. However, the disk devices 250 in the additional chassis 410, 412 may be divided into and defined as RAID groups having redundant configurations such as RAID configurations, so that each RAID group can be started or stopped individually. In this case, all or some storage areas in one or more disk devices 250 constituting one RAID group are defined as a logical storage area (hereinafter referred to as a "logical volume") 252. Logical volumes 252 are provided as virtual or logical storage devices to the host(s) 100.

Although not shown in the drawing, the storage controller 210, the fans 230, 260, the power sources 240, 270, and the control substrates 280 may be provided in redundant configurations (e.g., twin configurations) in order to enhance reliability.

FIG. 3 shows an example of a power management table 222 stored in the control memory 220 for the basic chassis 400 of the storage apparatus 200.

The power management table 222 is a table that stores information for managing electric power that can be supplied from the external power source 600 to the loads, and information for managing power consumed by the basic chassis 400 and the additional chassis 410, 412.

This power management table 222 is composed of a "specified electric power" field 222A and a "current power consumption" field 222B. The "specified electric power" field 222A stores specified electric power (e.g., 2000 W) smaller than the maximum possible electric power supplied from the external power source 600 to the loads such as the basic chassis 400 and the additional chassis 410, 412, i.e., the specified electric power equal to or less than a threshold value. The "current power consumption" field 222B stores the current power consumed (e.g., 1200 W) by the loads such as the basic chassis 400.

FIG. 4 shows an example of a catalogue specification table 223 stored in the control memory 220 for the basic chassis 400 of the storage apparatus 200.

The catalogue specification table 223 is a table that stores power consumed by the basic chassis 400 and the additional chassis 410, 412 in accordance with catalogue specifications of the basic chassis 400 and the additional chassis 410, 412.

The catalogue specification table 223 is composed of a "chassis type" field 223A, a "power consumption" field 223B, and a "remarks" field 223C. The "chassis type" field 223A stores names for classifying the respective chassis, for example, "controller chassis" as the name of the basic chassis 400, "FC (Fibre Channel) additional chassis" as the name of the additional chassis 410, and "SATA (Serial ATA) additional chassis" as the name of the additional chassis 412. The "power consumption" field 223B stores: the power consumed by the controller chassis, for example, "500 W" as power consumption during normal operation and "550 W" as start-up power consumption; power consumed by the FC additional chassis, for example, "500 W" as power consumption during normal operation and "600 W" as start-up power consumption; and power consumed by the SATA additional chassis, for example, "300 W" as power consumption during normal operation and "350 W" as start-up power consumption. The "remarks" field 223C stores: information indicating that two disk controllers are mounted as the controller chassis; information indicating that 15 FC disks are mounted as the FC additional chassis; and information indicating that 15 SATA disks are mounted as the SATA additional chassis.

FIG. 5 shows an example of a start-up order table 225 stored in the control memory 220 for the basic chassis 400 of the storage apparatus 200.

The start-up order table 225 is a table that stores information indicating the order in which the basic chassis 400 and the additional chassis 410, 412 are started.

The start-up order table 225 is composed of a "start-up control unit" field 225A, a "chassis type" field 225B, a "normal-operation/start-up power consumption" field 225C, a "predicted power consumption" field 225D, a "start-up type" field 225E, a "start-up priority" field 225F, and an "operation status" field 225G.

When starting or re-starting a start-up control unit, and if each chassis is defined as a start-up control unit that is a target to be started, the "start-up control unit" field 225A stores: a unique name for the basic chassis 400 such as "basic chassis 001"; a unique name for the additional chassis 410 such as "additional chassis 001"; and a unique name for the additional chassis 412 such as "additional chassis 002." Also, the "start-up control unit" field 225A stores unique names for other additional chassis such as "additional chassis 003" and "additional chassis 004."

The "chassis type" field 225B stores names for classifying the respective chassis, such as "controller chassis" for the basic chassis 001, "FC additional chassis" for the additional chassis 001, and "SATA additional chassis" for the additional chassis 002. If the type of the additional chassis 003, 004 is unknown, the "chassis type" field 225B stores "unknown."

The "normal-operation/start-up power consumption" field 225C stores power consumed when each chassis is in normal operation or is started. Regarding the basic chassis 001, the "normal-operation/start-up power consumption" field 225C stores "500 W" as normal-operation power consumption and "550 W" as start-up power consumption. Similarly, the "normal-operation/start-up power consumption" field 225C stores "500/600 W" regarding the additional chassis 001 and "300/350 W" regarding the additional chassis 002. Since the power consumed by the additional chassis 003, 004 is unknown, the "normal-operation/start-up power consumption" field 225C stores "unknown/unknown" as the normal-operation/start-up power consumed by the additional chassis 003, 004 respectively.

The "predicted power consumption" field 225D stores the predicted power consumption for each chassis, which is obtained from the catalogue specification table 223, for example, "600 W" for the additional chassis 001 and "600 W" for the additional chassis 002. Incidentally, even if the specific configuration of the additional chassis 003, 004 is unknown, "600 W" is stored as their predicted power consumption by referring to the values for the additional chassis 001, 002.

The "start-up type" field 225E stores reasons for starting each chassis. Since the reason for starting the basic chassis 001 is normal start-up, the "start-up type" field 225E stores "normal start-up." Since the additional chassis 001 does not have to be started, no start-up type is stored. Furthermore, the "start-up type" field 225E stores "initial start-up" for the additional chassis 002 and also for the additional chassis 003, 004.

The "start-up priority" field 225F stores the order of starting the respective stopped additional chassis, using the numbers "1, 2, 3, 4, . . . ." In this case, number "1" represents the highest priority; and the larger the number is, the later the relevant chassis is started in the start-up order. Incidentally, since the basic chassis 001 is "normal start-up," the "start-up priority" field 225F stores "5."

The "operation status" field 225 stores the operation status of each chassis, for example, "in operation" for the basic chassis 001, "stopped" for the additional chassis 001, and "in operation" for the additional chassis 002. Incidentally, since the operation status of the additional chassis 003, 004 is unknown, the "operation status" field 225G stores no information about their operation status.

Next, the operation of the first embodiment will be explained below following the flowchart in FIG. 6. When the main power switch 502 is turned on and power is supplied from the power source 240 for the basic chassis 400, the CPU 214 for the storage controller 210, serving as the controller, first judges whether power-saving start-up is selected or not (S1). If the power-saving start-up is not selected, i.e., if the CPU 214 determines that the power-saving mode is not selected, the CPU 214 executes normal start-up sequence (S2).

In step S2, the CPU 214 executes the start-up sequence for starting only the basic chassis 400 and controlling it with the maximum possible power supplied from the external power source 600, so-called "maximum power control"; sets, in the power management table 222, specified electric power that is a threshold value smaller than the maximum possible power supplied from the external power source 600 to the loads; stores the set value for the specified electric power in the "specified electric power" field 222A of the power management table 222; and then terminates the processing.

On the other hand, if the power-saving start-up is selected, i.e., if the CPU 214 determines that the power-saving mode is selected, the CPU 214 executes a power-saving start-up sequence (S3) and then terminates the processing in this routine.

Figure 7:
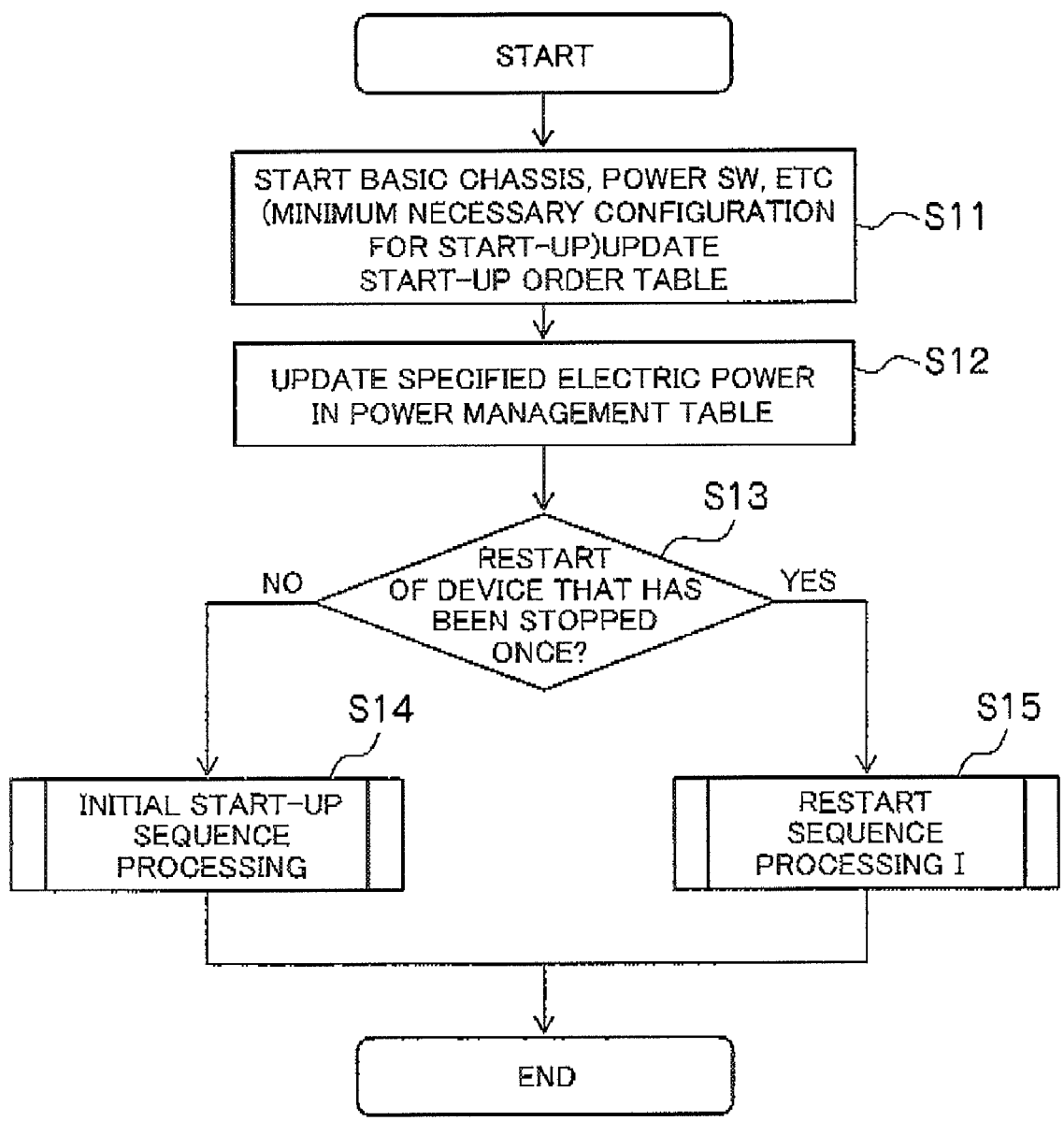
FIG. 7 is a flowchart explaining power-saving start-up sequence processing.

Next, the operation of the power-saving start-up sequence in step S3 will be explained following the flowchart in FIG. 7. When executing the power-saving start-up sequence, if the main power switch 502 is turned on and power is supplied from the power source 240, the CPU 214 starts the basic chassis 400, collects the minimum configuration information necessary for the start-up such as model numbers of various modules in the basic chassis 400 and various setting values, and updates the star-up order table 225 (S11); further updates the value for the "specified electric power" field 222A in the power management table 222 (S12); and then judges, by referring to the operation log 226 as the memory unit, whether start-up is restarting of a device that has been stopped once ((S13).

If the CPU 214 determines that start-up is not restarting of the relevant device that has been stopped once, i.e., that startup is initial start-up, the CPU 214 executes initial start-up sequence processing (S14) and then terminates the processing in this routine.

On the other hand, if the CPU 214 determines that start-up is restarting of the relevant device that has been stopped once, the CPU 214 executes restart sequence processing for restarting the relevant device (S15) and then terminates the processing in this routine.

When additional chassis is added, processing similar to the basic chassis initial start-up sequence is executed. If there is any existing start-up control unit (additional chassis) for which initialization has finished, the processing may be started by not only turning on power for the basic chassis 400, but also by detecting insertion of an additional portion of the device or in accordance with the user's instructions.

Figure 8:
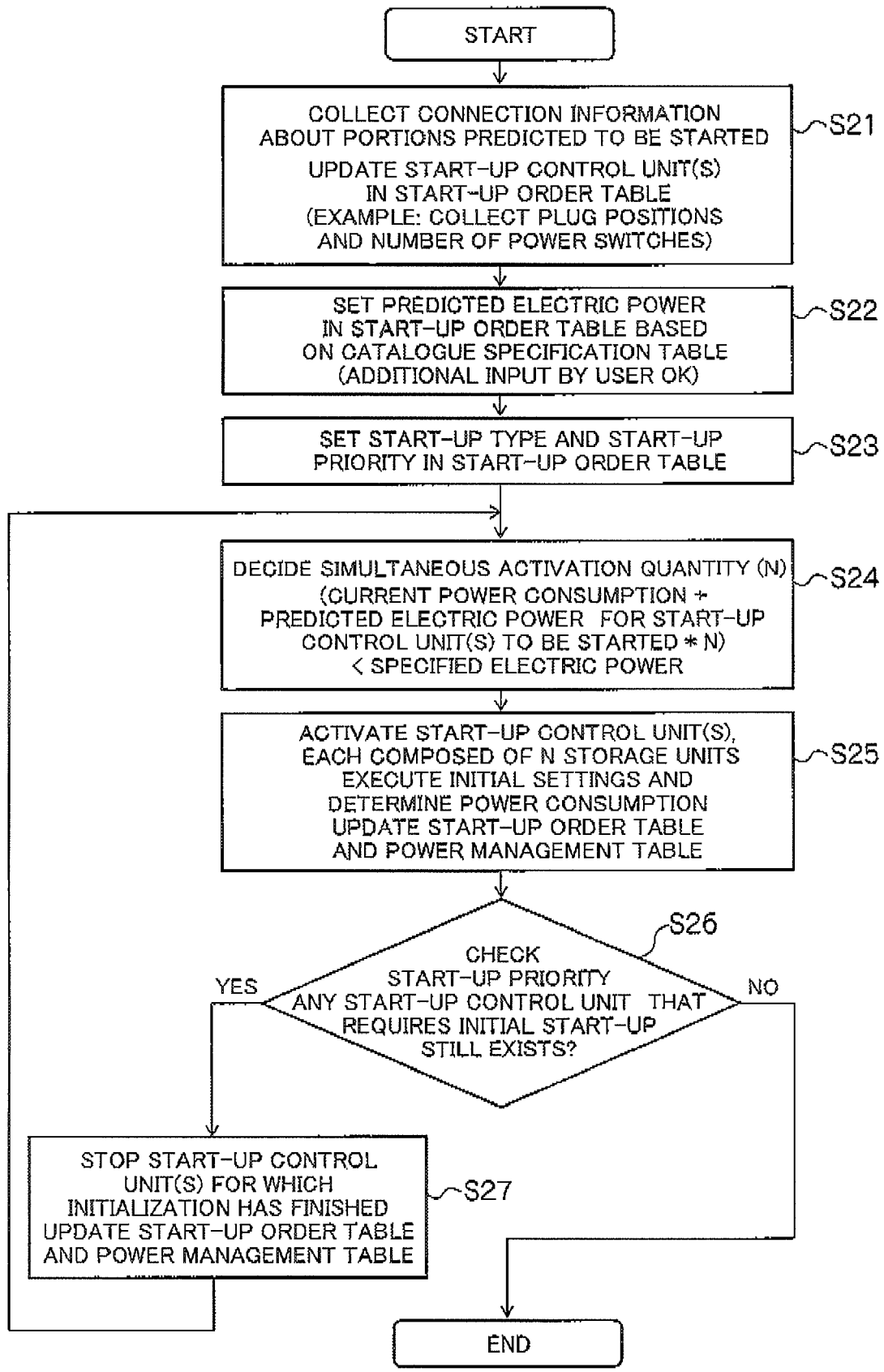
FIG. 8 is a flowchart explaining initial start-up sequence processing.

Next, the initial start-up sequence processing in step S14 will be explained following the flowchart in FIG. 8. When executing the initial start-up sequence processing, the CPU 214 first collects connection information about portions predicted to be started (additional chassis that will be start-up control units), updates the start-up control units in the "start-up control unit" field 225A by referring to the start-up-order table 225, and collects the positions and number of the auxiliary power switches 510, 512 (S21); further sets predicted power consumption for the additional chassis 001 to 004 in the start-up order table 225 based on the predicted power consumption obtained from the catalogue specification table 223 or predicted power consumption input by the user (S22); and further sets "initial start-up" for the additional chassis 002, 003, 004 respectively as the start-up type in the "start-up type" field 225E of the start-up order table 225 and sets the start-up priority in the "start-up priority" field 225F (S23).

The start-up priority is a value indicating which order for activating the stopped start-up control units (additional chassis in this embodiment) can more efficiently expedite the activation of the storage apparatus or storage unit and is set using numerical values such as 1, 2, 3, 4, . . . . The start-up priority "1" is the highest priority; and the larger the numeral value becomes, the later the relevant start-up control unit is started.

As specifically shown in FIG. 9, start-up priority "1" is used in the case of initial start-up or when the relevant start-up control unit is a target of destage processing after being restarted. Start-up priority "2" is used when any changed portion is included, for example, when a changed portion with an HDD (Hard Disk Drive) increase or decrease is included. Start-up priority "3" is used when there is any start-up reason other than access by the host(s), for example, when a periodical disk diagnosis is performed.

Start-up priority "4" is used when the relevant start-up control unit was in operation (not always-on operation) when the start-up control unit stopped last time. Start-up priority "5" is used when the always-on operation setting is made. If there is no start-up priority value, that means start-up is unnecessary. Incidentally, whether operation is always-on or not can be arbitrarily set by the user or automatically set according to, for example, operation time and access frequency.

After executing the processing in step S23, the CPU 214 decides the quantity of additional chassis to be activated simultaneously ("N" additional chassis: "N" is an integer equal to or more than two). Specifically speaking, the CPU 214 decides "two or more" as the simultaneously activated quantity of additional chassis so that the total amount of power consumption obtained by "current power consumption for the basic chassis 400 (in normal operation)+predicted power consumption for start-up control unit(s) to be started (when started)×N," i.e., the total power consumption for the basic chassis 400 and the additional chassis including the additional chassis 410, 412 as recognized by the external power source 600 will not exceed the specified electric power (S24).

Subsequently, the CPU 214 selects the decided N additional chassis as storage units belonging to a start-up control unit, turns on the auxiliary power switches corresponding to the storage units (additional chassis) belonging to the selected start-up control unit(s), and activates the start-up control units each composed of N storage units (S25). For example, in order to activate two additional chassis 410, 412 as a start-up control unit, the auxiliary power switches 510, 512 are turned on and the additional chassis 410, 412 are activated simultaneously.

Then, the CPU 214 executes initial settings for the activated additional chassis and processing for determining power consumption and also updates the start-up order table 225 and the power management table 222. When determining the power consumption, the CPU 214 executes processing, by simultaneously activating and feeding power to the additional chassis 410, 412, for calculating power consumed by the additional chassis 410, 412, estimating power consumed by the additional chassis 410, 412 based on the configurations of the additional chassis 410, 412, or comparing the power consumption described in catalogue specifications with the actually measured power consumption. Subsequently, the CPU 214 checks the "start-up priority" field 225F and judges whether any start-up control unit that requires initial start-up still exists or not (S26). If such start-up control unit still exists, the CPU 214 stops starting the start-up control unit(s) for which initialization has finished, and updates the start-up order table 225 and the power management table 222 (S27), and then repeats the processing, from step S24 to step S26.

If it is determined that there is no start-up control unit requiring initial start-up, the CPU 214 terminates the processing in this routine.

When the CPU 214 executes the initial start-up sequence, if the disk devices 250 and the fans 260 for the additional chassis, such as the additional chassis 410, 412, are turned off and only the additional chassis are started and basic configuration information about each additional chassis is collected, the CPU 214 sequentially repeats the sequence processing for starting only the additional chassis. After initial start-up of all the additional chassis has finished, and if the disk devices 250 and the fans 260 are turned on, the CPU 214 repeats the processing for starting the additional chassis 410, 412 sequentially.

Regarding the predicted power consumption for start-up control units to be started in the above circumstances, power predicted to be consumed when the disk devices 250 and the fans 260 are off is used at the time of the initial start-up; and if the disk devices 250 are then also started, a power value obtained by adding the predicted power consumption for the disk devices 250 and the fans 260 to the above-mentioned power is used as the predicted power consumption for all the loads.

For the initial start-up, it is always necessary to start the disk devices 250 once in order to initialize the disks and collect vendor-specific information previously registered with the disks. If the operation at the time of initial start-up is unnecessary, there is a possibility that the disk devices 250 may not be started.

Also, the disk devices 250 can be started in multiple steps. If there are sixteen disk devices 250 in one additional chassis, and if the specified electric power does not satisfy the conditions for starting the sixteen disk devices 250 at the same time, it is possible to divide the sixteen disk devices 250 into, for example, groups of eight disk devices 250 and repeat starting and then stopping the eight disk devices 250.

In this case, the predicted power consumption per disk device 250 needs to be stored in the catalogue specification table 223 in advance, or reported by the control substrate 280 via the inter-chassis switch 420 to the CPU 214, or input by the user in advance.

When initially starting additional chassis (storage units) according to this embodiment, two or more additional chassis (storage units) 410, 412 are selected as a start-up control unit based on the predicted power consumption for the additional chassis 410, 412 so that total power consumption for the basic chassis (controller) 400 and the additional chassis (storage units) 410, 412 as recognized by the external power source 600 will not exceed specified electric power that is smaller than the maximum possible electric power supplied from the external power source 600; and the additional chassis (storage units) 410, 412 are then started by turning on the auxiliary power switch 510, 512 corresponding to the additional chassis (storage units) 410, 412 belonging to the selected start-up control unit. As a result, the number of start-up times and power consumption can be reduced, and the two or more additional chassis (storage units) 410, 412 can be activated promptly.

Figure 10:
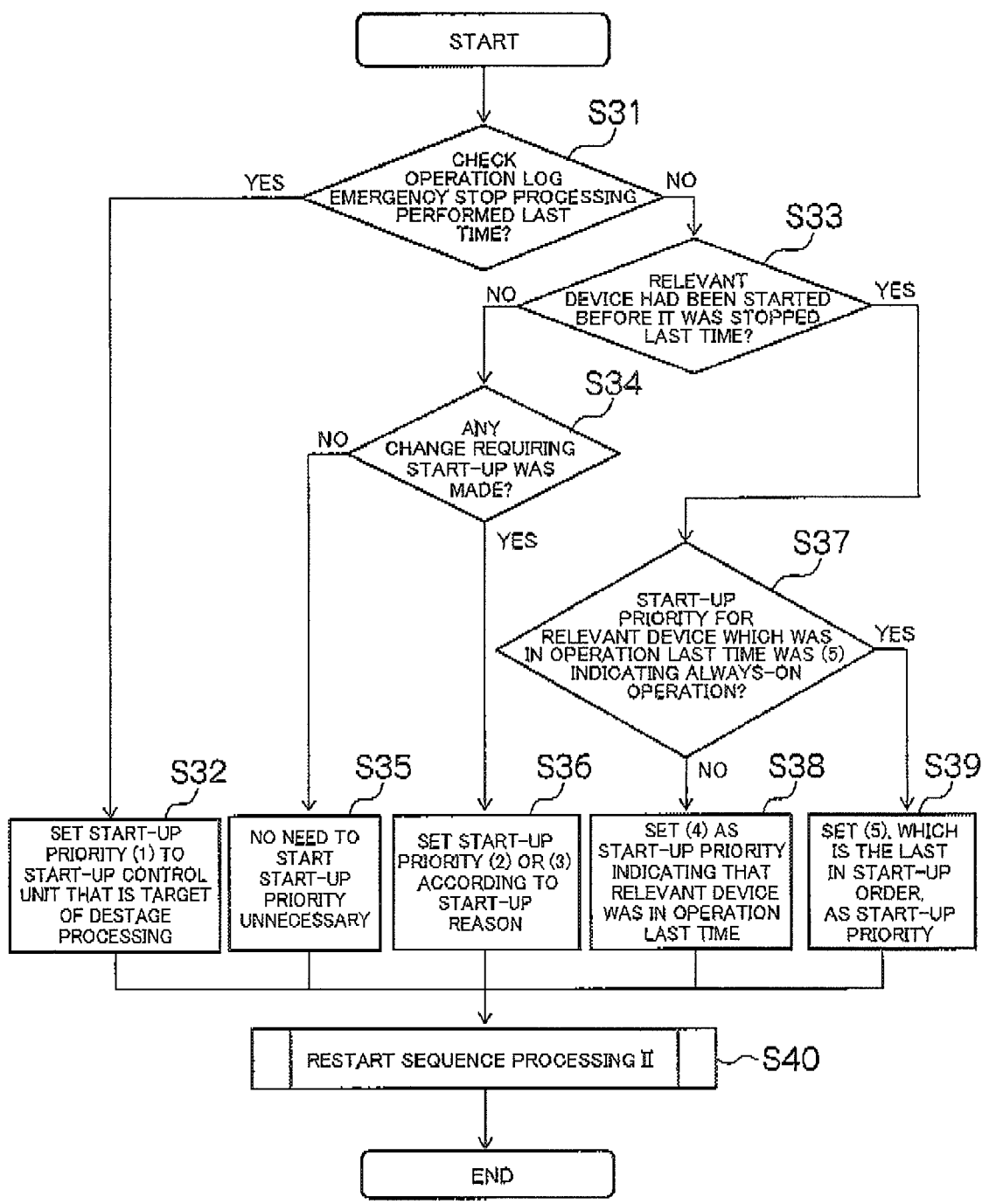
FIG. 10 is a flowchart explaining restart sequence #1 processing.

Next, how to execute restart sequence processing, which is the processing according to the second embodiment of this invention, for each start-up control unit will be explained following the flowchart in FIG. 10. This restart sequence processing is started when it is determined in step S13 in FIG. 7 that start-up is restarting of the relevant device that has been stopped once.

The CPU 214 first refers to the operation log 226 and judges whether or not emergency stop processing was executed last time (S31). If it is determined that the emergency stop processing was executed last time, the start-up priority of start-up control unit(s) (additional chassis) which is a target of destage processing is set to "1" (S32). When restarting the start-up control unit(s) after the emergency stop processing, since data that could not be destaged from the cache memory 213 to the disk devices 250 last time still remaining in the cache memory 213 still exists, it is necessary to execute processing for destaging that data. Subsequently, the CPU 214 proceeds to restart sequence #2 processing. In other words, if the emergency stop processing has taken place, data is not migrated yet to the disk devices 250; so, it is necessary to give top priority to destaging of the data remaining in the cache memory 213. Therefore, the CPU 214 executes processing for increasing the start-up priority for restarting of the start-up control unit having the disk devices 250 to which the data remaining in the cache memory 213 should be destaged. Since the highest priority needs to be given to restarting of the start-up control unit which is the target of the destage processing, the CPU 214 executes processing for setting "1" as the start-up priority.

If it is determined that the emergency stop processing was not executed last time, the CPU 214 refers to the operation log 226 and then judges whether or not the relevant device had been started before it was stopped last time (S33). If the additional chassis 410 had not been started before it was stopped last time, the CPU 214 determines that the additional chassis 410 had not been started before it was stopped last time; and the CPU 214 then judges whether or not any change requiring start-up was made (S34). When judging whether or not any change requiring start-up was made, the CPU 214 fetches configuration information about, for example, the additional chassis 410 and then judges, for example, whether the configuration of the additional chassis 410 has been changed or not, or whether any change has been made to components of the additional chassis 410 or not. If no change requiring start-up has been made, the CPU 214 determines that start-up is not necessary, i.e., restarting is not necessary and, therefore, sets no start-up priority (S35) and then proceeds to the restart sequence #2 processing.

Meanwhile, if it is determined in step S34 that a change requiring start-up has been made, the CPU 214 checks the reason for start-up. For example, the CPU 214 checks if the user has given any instruction to restart the relevant device indicating that some change which was made while the relevant device was stopped is the reason why the relevant device should be started now (although the relevant device was stopped last time). Alternatively, the CPU 214 checks if any change has been made to the configuration information for the entire system maintained by the basic chassis, or the CPU 214 checks if any change has been made to the configuration information by comparing configuration information collected when only the additional chassis were started in the state where the disks were stopped (as described later), with configuration information collected when the additional chassis were started last time. After checking the information above, the CPU 214 sets the start-up priority to (2) or (3) according to the reason for start-up (S36) and then proceeds to the restart sequence #2 processing.

Meanwhile, if it is determined in step S33 that the relevant device had been started before it was started last time, the CPU 214 judges whether or not the start-up priority for, for example, the additional chassis 410 which was in operation last time was "5" indicating "always-on operation" (S37). If a negative judgment is returned, the CPU 214 sets "4" as the priority, indicating "the relevant device was in operation last time" in the "start-up priority" field 225F in the start-up order table 226 (S38) and then proceeds to the restart sequence #2 processing. If an affirmative judgment is returned in step S37, the CPU 214 sets "5" as the start-up priority, which is the last in start-up order (S39), and the CPU 214 then proceeds to the restart sequence #2 processing (S40) and terminates the processing in this routine.

Figure 11:
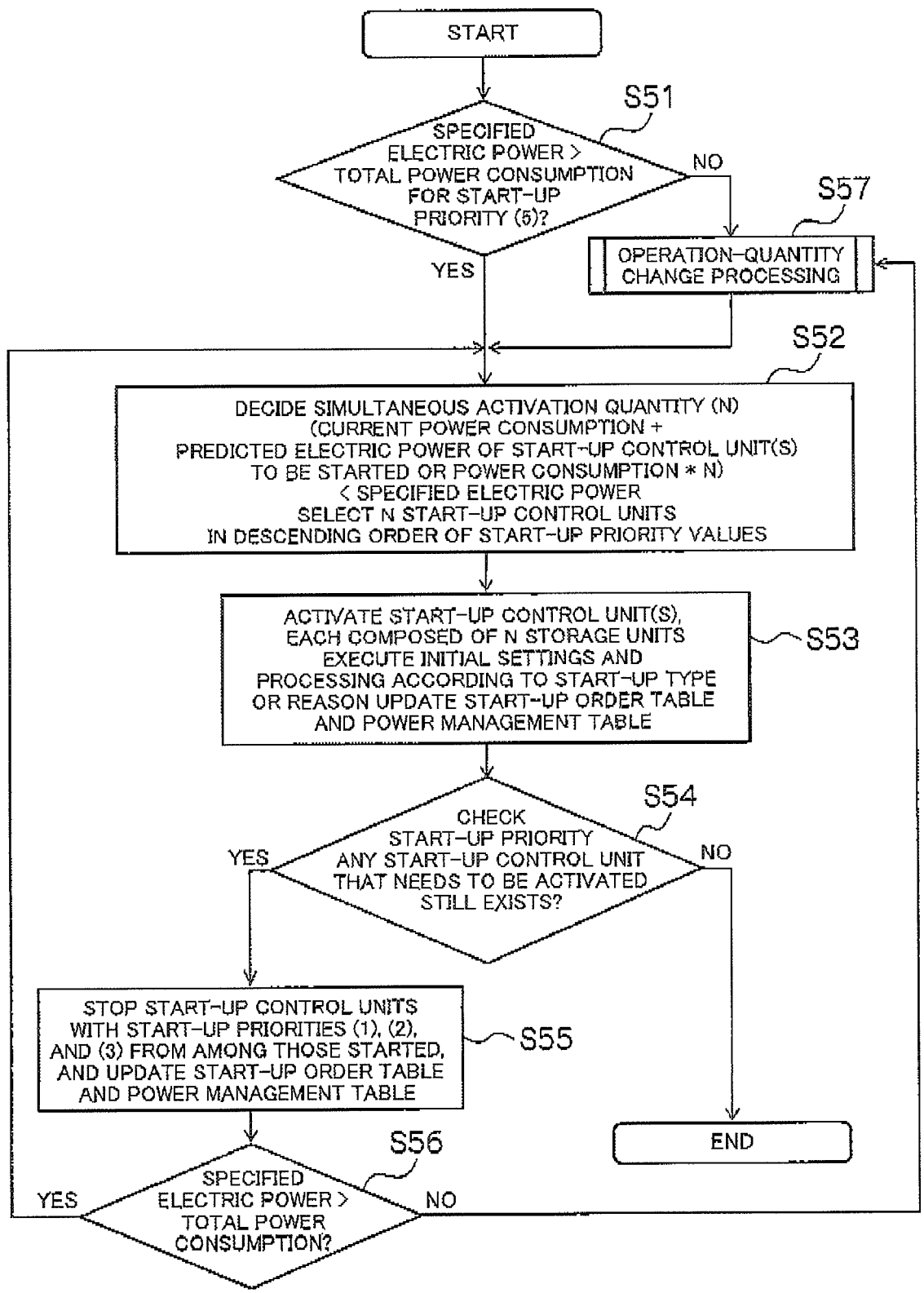
FIG. 11 is a flowchart explaining restart sequence #2 processing.

Next, the restart sequence #2 processing executed in step S40 shown in FIG. 10 will be explained following the flowchart in FIG. 11. After starting execution of the restart sequence #2 processing, the CPU 214 judges whether the total amount of actual power consumption for the additional chassis, which are start-up control units and whose start-up priority is "5," is less than the specified electric power or not (S51). If an affirmative judgment is returned, the CPU 214 executes processing for deciding the quantity (N) of additional chassis to be activated simultaneously (S52).

In this step, the CPU 214 selects N additional chassis so that "the current power consumption for the basic chassis 400 (during normal operation)+predicted power consumption for start-up control unit(s) to be restarted (when started) or actual power consumption for such start-up control unit(s) (when started)×N" will be less than the specified electric power. Specifically speaking, the CPU 214 selects N (two or more) chassis with smaller start-up priority values, i.e., in descending order of start-up priorities.

Subsequently, the CPU 214 activates the start-up control units (additional chassis) at the same time, each unit being composed of N additional chassis, executes the initial settings and processing according to start-up type or reasons for the activated additional chassis, and updates the start-up order table 225 and the power management table 222 (S53). The CPU 214 refers to the start-up priority in the "start-up priority" field 225F of the start-up order table 225 with regard to the start-up control unit(s) indicated as "stopped" in the "operation status" field 225G, and then judges whether any start-up control unit that needs to be activated still exists or not (S54).

If an affirmative judgment is returned in step S54, the CPU 214 stops, from among the activated start-up control units, those having the start-up priorities (1), (2), and (3) (S55). Specifically speaking, once the start-up control units are started and the processing according to the relevant start-up type or reasons has finished, it is no longer necessary to keep the start-up control units having the start-up priorities (1), (2), and (3) in operation; and, therefore, in the case of limited electric power, the CPU 214 stops such start-up control units. The CPU 214 updates the start-up order table 225 in order to change the start-up priorities of the stopped start-up control units to "--", and also updates the power management table 225 in order to update the current power consumption. Next, the CPU 214 judges whether the total amount of power consumption for all the start-up control units that need to be activated will be less than the specified electric power or not (S56). If an affirmative judgment is returned in step S56, the CPU 214 repeats the processing from step S52 to step S56; or if a negative judgment is returned in step S56, the CPU 214 proceeds to operation-quantity change processing (S57) and repeats the processing from step S52 to step S56.

Meanwhile, if it is determined in step S54 that there is no start-up control unit that needs to be activated, and if there is no start-up control unit with the start-up priority (1), (2), or (3) or no start-up control unit with the start-up priority (4) or (5) which is stopped, the CPU 214 terminates the processing in this routine.

Figure 12:
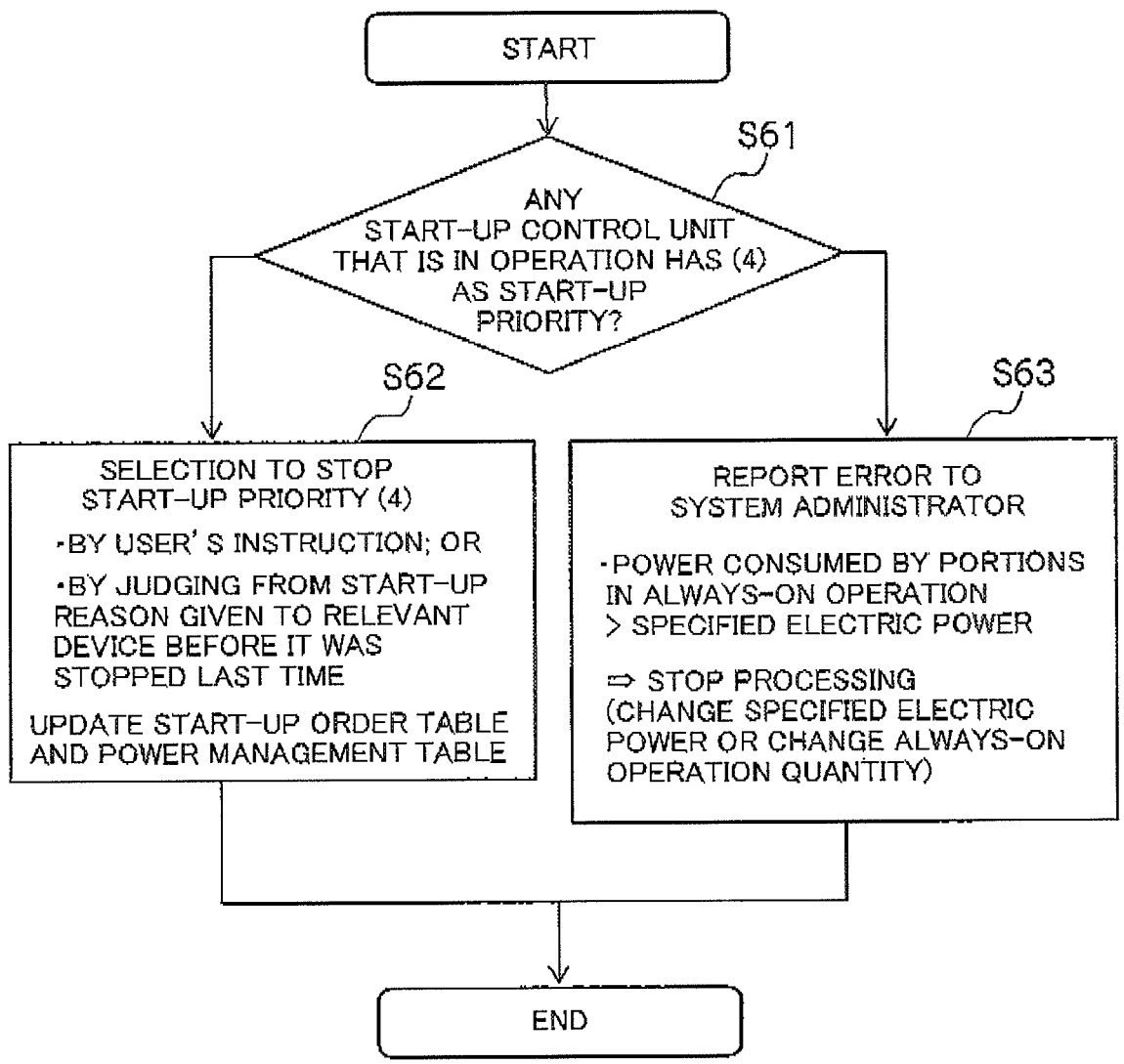
FIG. 12 is a flowchart explaining operation quantity change processing.

Next, specific details of the operation-quantity change processing executed in step S37 will be explained following the flowchart in FIG. 12. When executing the operation-quantity change processing, the CPU 214 first judges whether or not there is any start-up control unit whose operation status is "in operation" and which has "4" as its start-up priority (S61). If an affirmative judgment is returned in step S61, the CPU 214 executes processing for selecting to stop the start-up control unit(s) (additional chassis) in operation and with the start-up priority "4" and then terminates the processing in this routine (S62). In this step S62, the CPU 214 executes the processing for stopping the start-up control unit(s) with the start-up priority "4" in accordance with instructions from the user or by judging from the start-up reason given to the relevant device before it was stopped last time, and the CPU 214 then updates the start-up order table 225 and the power management table 222.

On the other hand, if a negative judgment is returned in step S61, the CPU 214 reports an error to a system administrator and then terminates the processing in this routine (S63). Specifically speaking, since in step S63 the power consumption for the portions in always-on operation exceeds the specified electric power, the CPU 214 reports the error to the system administrator, stops the restart processing, and prompts the user to execute processing for changing the specified electric power or the always-on operation quantity.

When restarting additional chassis (storage units) according to this embodiment, two or more additional chassis (storage units) 410, 412 that were in operation before being restarted are selected as a start-up control unit based on the actual power consumption for the additional chassis (storage units) 410, 412, so that total power consumption for the basic chassis (controller) 400 and the additional chassis (storage units) 410, 412 as recognized by the external power source 600 will not exceed the specified electric power that is smaller than the maximum possible electric power supplied by the external power source 600; and the auxiliary power switch 510, 512 corresponding to the additional chassis (storage units) 410, 412 belonging to the selected start-up control unit are turned on to restart the additional chassis (storage units). As a result, the number of times restart is conducted and power consumption can be reduced, and the two or more additional chassis (storage units) 410, 412 can be restarted promptly.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage apparatus comprising:
a memory unit including a group of storage devices as its main elements; and
a controller for controlling the memory unit by receiving a supply of power from a power source and dividing the memory unit into a plurality of start-up control units that can be started,
wherein at the time of initial start-up of the start-up control units, the controller selects and starts, from among the plurality of start-up control units and based on predicted power consumption for the memory unit, two or more start-up control units so that total power consumption for the memory unit and the controller as recognized by the power source will not exceed specified electric power that is smaller than the maximum possible electric power supplied from the power source,
wherein the memory unit includes a plurality of storage units connected to the power source via a plurality of auxiliary power switches connected in parallel with a main power switch connecting the power source and the controller, and
wherein the controller selects, from among the plurality of storage units and based on the predicted power consumption, two or more storage units as the startup control unit so that total power consumption for the plurality of storage units and the controller as recognized by the power source will not exceed specified electric power that is smaller than the maximum possible electric power supplied from the power source; and the controller then turns on the auxiliary power switches corresponding to the selected two or more storage units and thereby starts the selected two or more storage units; and subsequently, if the auxiliary power switches corresponding to the started two or more storage units are turned off, the controller then sequentially selects, from among the plurality of storage units and based on the predicted power consumption, two or more storage units, as the start-up control unit, different from those started above so that total power consumption for the plurality of storage units and the controller as recognized by the power source will not exceed specified electric power that is smaller than the maximum possible electric power supplied from the power source; and the controller then sequentially turns on the auxiliary power switches corresponding to the selected two or more storage units and thereby sequentially starts the selected two or more storage units.

2. The storage apparatus according to claim 1, wherein the controller uses the predicted power consumption obtained when the storage devices are off.

3. The storage apparatus according to claim 1, wherein the controller uses the predicted power consumption obtained assuming that the storage devices will be turned on.

4. A storage apparatus comprising:
a memory unit including a group of storage devices as its main elements; and
a controller for controlling the memory unit by receiving a supply of power from a power source and dividing the memory unit into a plurality of start-up control units that can be started,
wherein at the time of restart of the start-up control units, the controller selects and restarts, from among the plurality of start-up control units and based on actual power consumption for the memory unit, two or more start-up control units so that total power consumption for the memory unit and the controller as recognized by the power source will not exceed specified electric power that is smaller than the maximum possible electric power supplied from the power source,
wherein the memory unit includes a plurality of storage units connected to the power source via a plurality of auxiliary power switches connected in parallel with a main power switch connecting the power source and the controller, and
wherein the controller selects, from among the plurality of storage units and based on the actual power consumption, two or more storage units as the start-up control unit so that total power consumption for the plurality of storage units and the controller as recognized by the power source will not exceed specified electric power that is smaller than the maximum possible electric power supplied from the power source; and the controller then turns on the auxiliary power switches corresponding to the selected two or more storage units and thereby restarts the selected two or more storage units; and subsequently, if the auxiliary power switches corresponding to the restarted two or more storage units are turned off, the controller then sequentially selects, from among the plurality of storage units and based on the actual power consumption, two or more storage units, as the start-up control unit, different from those restarted above so that total power consumption for the plurality of storage units and the controller as recognized by the power source will not exceed specified electric power that is smaller than the maximum possible electric power supplied from the power source; and the controller then sequentially turns on the auxiliary power switches corresponding to the selected two or more storage units and thereby sequentially restarts the selected two or more storage units.

5. The storage apparatus according to claim 4, wherein when selecting two or more start-up control units from among the plurality of start-up control units, the controller confirms, as a condition for the selection, that the relevant start-up control units were in operation before being restarted.

6. The storage apparatus according to claim 4, wherein when selecting two or more start-up control units from among the plurality of start-up control units, the controller selects the start-up control units in descending order of start-up priority.

7. A start-up control method for a storage apparatus equipped with a memory unit including a group of storage devices as its main elements, and a controller for controlling the memory unit by receiving a supply of power from a power source and dividing the memory unit into a plurality of stark-up control units that can be started,
the method comprising the step executed by the controller, at the time of initial start-up of the start-up control units, of selecting and starting, from among the plurality of start-up control units and based on predicted power consumption for the memory unit, two or more start-up control units so that total power consumption for the memory unit and the controller as recognized by the power source will not exceed specified electric power that is smaller than the maximum possible electric power supplied from the power source,
wherein the memory unit includes a plurality of storage units connected to the power source via a plurality of auxiliary power switches connected in parallel with a main power switch connecting the power source and the controller, and
wherein the method further comprises steps executed by the controller of:
selecting, from among the plurality of storage units and based on the predicted power consumption, two or more storage units as the start-up control unit so that total power consumption for the plurality of storage units and the controller as recognized by the power source will not exceed specified electric power that is smaller than the maximum possible electric power supplied from the power source;
turning on the auxiliary power switches corresponding to the selected two or more storage units and thereby starting the selected two or more storage units;
if the auxiliary power switches corresponding to the started two or more storage units are turned off after the above steps, sequentially selecting, from among the plurality of storage units and based on the predicted power consumption, two or more storage units, as the start-up control unit, different from those started above so that total power consumption for the plurality of storage units and the controller as recognized by the power source will not exceed specified electric power that is smaller than the maximum possible electric power supplied from the power source; and
sequentially turning on the auxiliary power switches corresponding to the selected two or more storage units and thereby sequentially starting the selected two or more storage units.

8. A start-up control method for a storage apparatus equipped with a memory unit including a group of storage devices as its main elements, and a controller for controlling the memory unit by receiving a supply of power from a power source and dividing the memory unit into a plurality of start-up control units that can be started,
the method comprising the step executed by the controller, at the time of restart of the start-up control units, of selecting and restarting, from among the plurality of start-up control units and based on actual power consumption for the memory unit, two or more startup control units so that total power consumption for the memory unit and the controller as recognized by the power source will not exceed specified electric power that is smaller than the maximum possible electric power supplied from the power source,
wherein, the memory unit includes a plurality of storage units connected to the power source via a plurality of auxiliary power switches connected in parallel with a main power switch connecting the power source and the controller, and
wherein the method further comprises steps executed by the controller of:
selecting, from among the plurality of storage units and based on the actual power consumption, two or more storage units as the start-up control unit so that total power consumption for the plurality of storage units and the controller as recognized by the power source will not exceed specified electric power that is smaller than the maximum possible electric power supplied from the power source;

turning on the auxiliary power switches corresponding to the selected two or more storage units and thereby restarting the selected two or more storage units;

if the auxiliary power switches corresponding to the restarted two or more storage units are tuned off after the above steps, sequentially selecting, from among the plurality of storage units and based on the actual power consumption, two or more-storage units, as the start-up control unit, different from those restarted above so that total power consumption for the plurality of storage units and the controller as recognized by the power source will not exceed specified electric power that is smaller than the maximum possible electric power supplied from the power source; and sequentially turning on the auxiliary power switches corresponding to the selected two or more storage units and thereby sequentially restarting the selected two or more storage units.

* * * * *